United States Patent
Veilleux, Jr. et al.

(10) Patent No.: US 11,549,914 B2
(45) Date of Patent: Jan. 10, 2023

(54) SURFACE ACOUSTIC WAVE SENSORS FOR AIR DATA PROBES

(71) Applicant: Hamilton Sundstrand Corporation, Charlotte, NC (US)

(72) Inventors: Leo J. Veilleux, Jr., Wethersfield, CT (US); Lubomir Ribarov, West Hartford, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 205 days.

(21) Appl. No.: 17/129,241

(22) Filed: Dec. 21, 2020

(65) Prior Publication Data

US 2022/0196600 A1    Jun. 23, 2022

(51) Int. Cl.
*G01N 29/02* (2006.01)
*G01K 1/024* (2021.01)
*G01K 11/26* (2006.01)
*G07C 5/08* (2006.01)

(52) U.S. Cl.
CPC .......... *G01N 29/022* (2013.01); *G01K 1/024* (2013.01); *G01K 11/265* (2013.01); *G07C 5/0808* (2013.01)

(58) Field of Classification Search
CPC ......... G01N 29/022; G01N 2291/0258; G01N 2291/02872; G01N 2291/0423; G01N 2291/2694; G01K 1/024; G01K 11/265; G01K 13/028; G07C 5/0808; B64D 15/20; B64D 43/02; G01P 5/165
See application file for complete search history.

(56) References Cited

U.S. PATENT DOCUMENTS

| | | | |
|---|---|---|---|
| 4,461,178 A | 7/1984 | Chamuel | |
| 4,604,612 A | 8/1986 | Watkins et al. | |
| 4,895,017 A * | 1/1990 | Pyke | G01N 29/022 73/24.06 |
| 5,331,849 A * | 7/1994 | Hedberg | G01P 5/165 73/182 |
| 5,466,067 A * | 11/1995 | Hagen | G01P 5/165 374/138 |
| 5,629,485 A | 5/1997 | Rose et al. | |
| 6,378,377 B2 | 4/2002 | Matuseski et al. | |
| 7,026,943 B2 | 4/2006 | Knowles et al. | |

(Continued)

FOREIGN PATENT DOCUMENTS

| CN | 109164024 A | 1/2019 |
|---|---|---|
| CN | 209972788 U | 1/2020 |

(Continued)

OTHER PUBLICATIONS

"Extended European Search Report", Extended European Search Report for EP Patent Application No. 21215177.3, dated May 3, 2022, 4 pages.

(Continued)

*Primary Examiner* — Francis C Gray
(74) *Attorney, Agent, or Firm* — Kinney & Lange, P.A.

(57) ABSTRACT

An air data system includes an air data probe and a surface acoustic wave (SAW) sensor attached to the air data probe for detecting particulate accumulation. The air data probe includes a probe head, a strut connected to the head, and a mounting plate connected to the strut. The probe head has an inlet, an interior surface extending from the inlet, and an exterior surface extending from the inlet.

20 Claims, 7 Drawing Sheets

(56) References Cited

U.S. PATENT DOCUMENTS

| | | | |
|---|---|---|---|
| 10,274,436 B2 | 4/2019 | Jean et al. | |
| 10,884,016 B2 * | 1/2021 | Sly | G01P 13/025 |
| 2004/0261518 A1 * | 12/2004 | Seidel | B64D 43/02 |
| | | | 73/182 |
| 2014/0053644 A1 * | 2/2014 | Anderson | G01P 5/165 |
| | | | 73/182 |
| 2015/0103864 A1 * | 4/2015 | Schwie | G01K 13/028 |
| | | | 374/148 |
| 2015/0153384 A1 | 6/2015 | Robert | |
| 2017/0369175 A1 * | 12/2017 | Gordon | B64D 43/02 |
| 2017/0370960 A1 * | 12/2017 | Benning | G01K 13/028 |
| 2018/0017591 A1 * | 1/2018 | Doolittle | G01P 5/165 |

FOREIGN PATENT DOCUMENTS

| | | |
|---|---|---|
| EP | 3538758 B1 | 7/2020 |
| WO | 2019097769 A1 | 5/2019 |

OTHER PUBLICATIONS

Bowers, W., Chuan, R., and Duong, T., "A 200 MHZ Surface Acoustic Wave Resonator Mass Microbalance," Rev. Sci. Instrum., vol. 62, (6), pp. 1624-1629, Jun. 1991.

Grate, A, Martin, S., and White, R., "Acoustic Wave Microsensors," Analytical Chemistry, vol. 65, No. 21, pp. 940A-948A, Nov. 1, 1993.

Grate, A, Martin, S., and White, R., "Acoustic Wave Microsensors. Part II." Analytical Chemistry, vol. 65, No. 22, pp. 987A-996A, Nov. 15, 1993.

\* cited by examiner

SURFACE ACOUSTIC WAVE SENSORS FOR AIR DATA PROBES

BACKGROUND

The present disclosure relates generally to air data probes, and in particular, to ice detection systems for air data probes.

Air data probes are installed on aircraft to measure air data parameters. Air data parameters may include barometric static pressure, altitude, air speed, angle of attack, angle of sideslip, air temperature, total air temperature, relative humidity, and/or any other parameter of interest. Air data probes may be, for example, pitot probes, pitot-static probes, total air temperature probes, or angle of attack sensors.

Air data probes are mounted to an exterior of an aircraft in order to gain exposure to external airflow. External airflow may contain water or ice particles that can collect and freeze onto the air data probe. Ice growth on an air data probe can interfere with the accuracy of the air data probe output.

SUMMARY

In one example, an air data system includes an air data probe and a surface acoustic wave (SAW) sensor attached to the air data probe for detecting particulate accumulation. The air data probe includes a probe head, a strut connected to the head, and a mounting plate connected to the strut. The probe head has an inlet, an interior surface extending from the inlet, and an exterior surface extending from the inlet.

In another example, an air data system includes an air data probe and a plurality of surface acoustic wave (SAW) sensors attached to the air data probe for detecting particulate accumulation. The air data probe includes a probe head, a strut connected to the head, and a mounting plate connected to the strut. The probe head has an inlet, an interior surface extending from the inlet, and an exterior surface extending from the inlet. At least one of the plurality of SAW sensors is positioned on each of the interior surface of the probe head, the exterior surface of the probe head, the strut, and the mounting plate.

In another example, a method of detecting particulate accumulation on an air data probe, the air data probe having a head, a strut connected to the head, and a mounting plate connected to the strut, includes positioning a surface acoustic wave (SAW) sensor on the air data probe; sensing, by the SAW sensor, an accumulation of particulates; sending a first signal, based on the sensed accumulation of particulates, from the SAW sensor to an air data system circuitry for detecting the accumulation of particulates; sending a second signal from the air data system circuitry to an electronic engine control and/or an aircraft on-board computer when a predetermined threshold level of particulate accumulation is detected; and synchronizing inputs from the first and/or second signal with an on-board prognostics and health management (PHM) system to provide predictive diagnostics for preventative on-board avionics maintenance.

DETAILED DESCRIPTION

In general, the present disclosure describes surface acoustic wave (SAW) sensors positioned in various locations and in various orientations on an air data probe. SAW sensors can reliably detect ice accumulation on the air data probe based on small changes in mass load. Reliable detection of icing enables proactive responses to icing conditions, ice detection system health management, and more efficient use of probe heaters. The air data probe with SAW sensors is described below with reference to FIGS. 1-5B.

Figure 1:
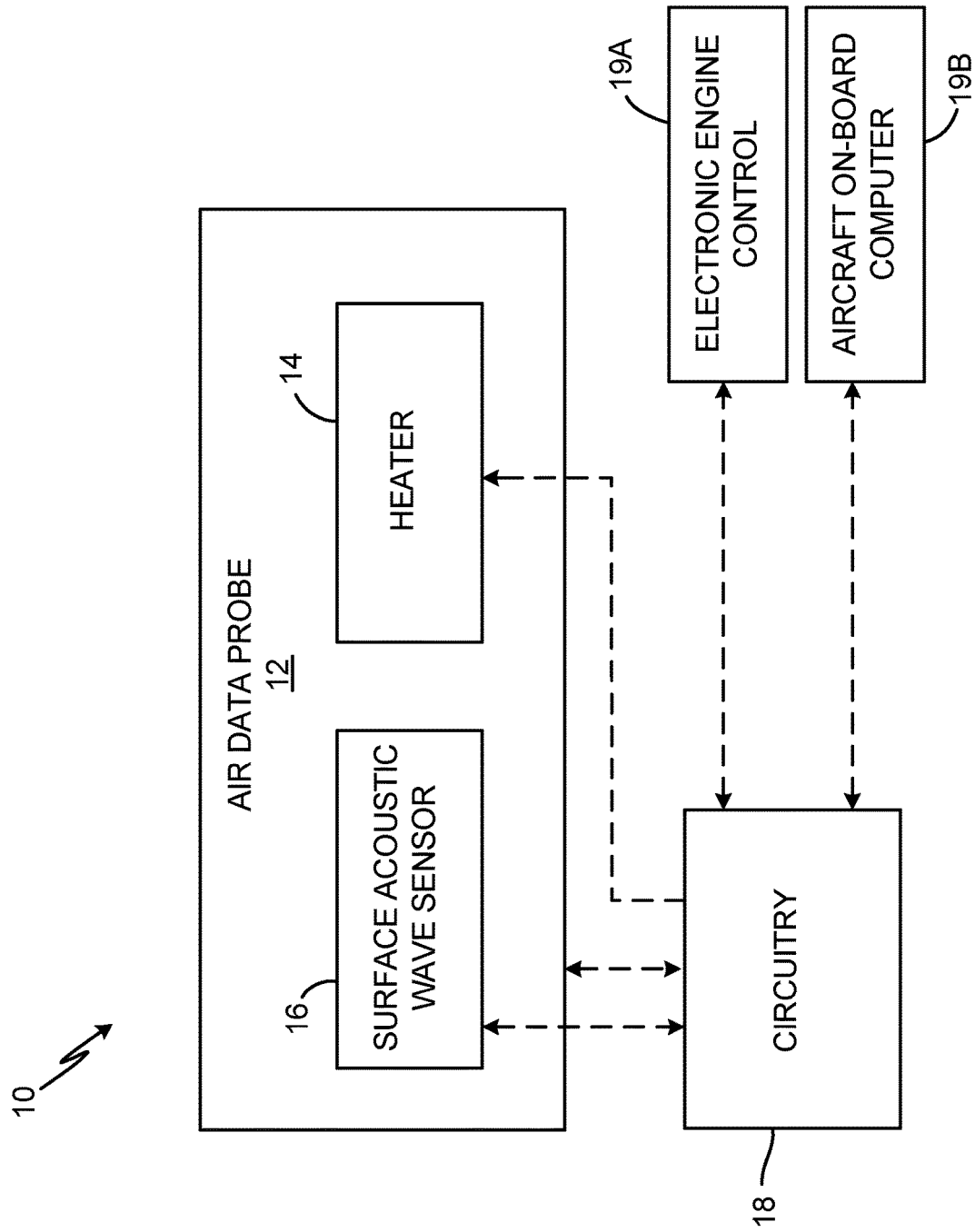
FIG. 1 is a schematic illustration of an air data system for detecting and responding to icing conditions.
Figure 2A:
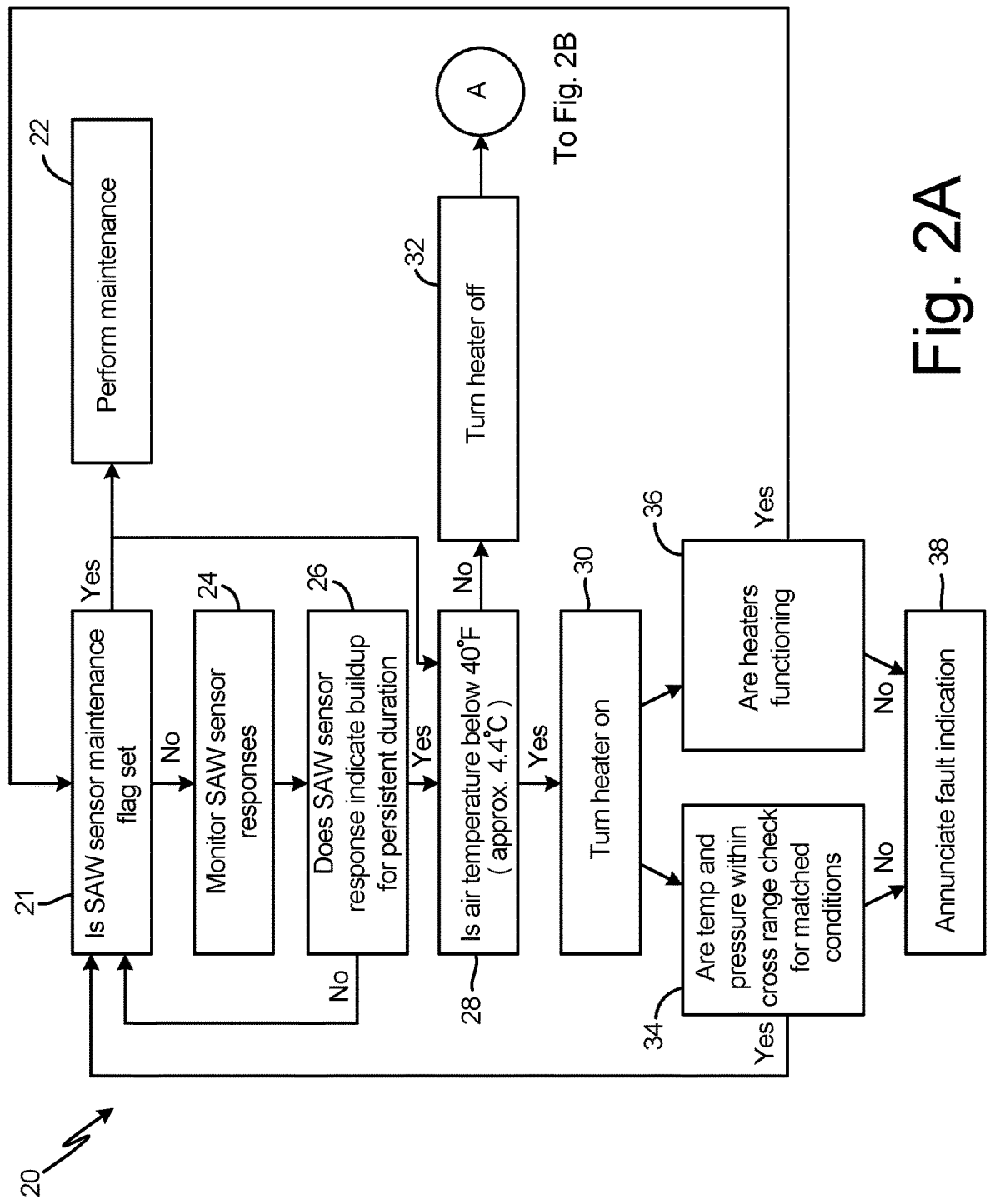
FIGS. 2A-2B form a flow chart illustrating an ice detection health management process.
Figure 2B:
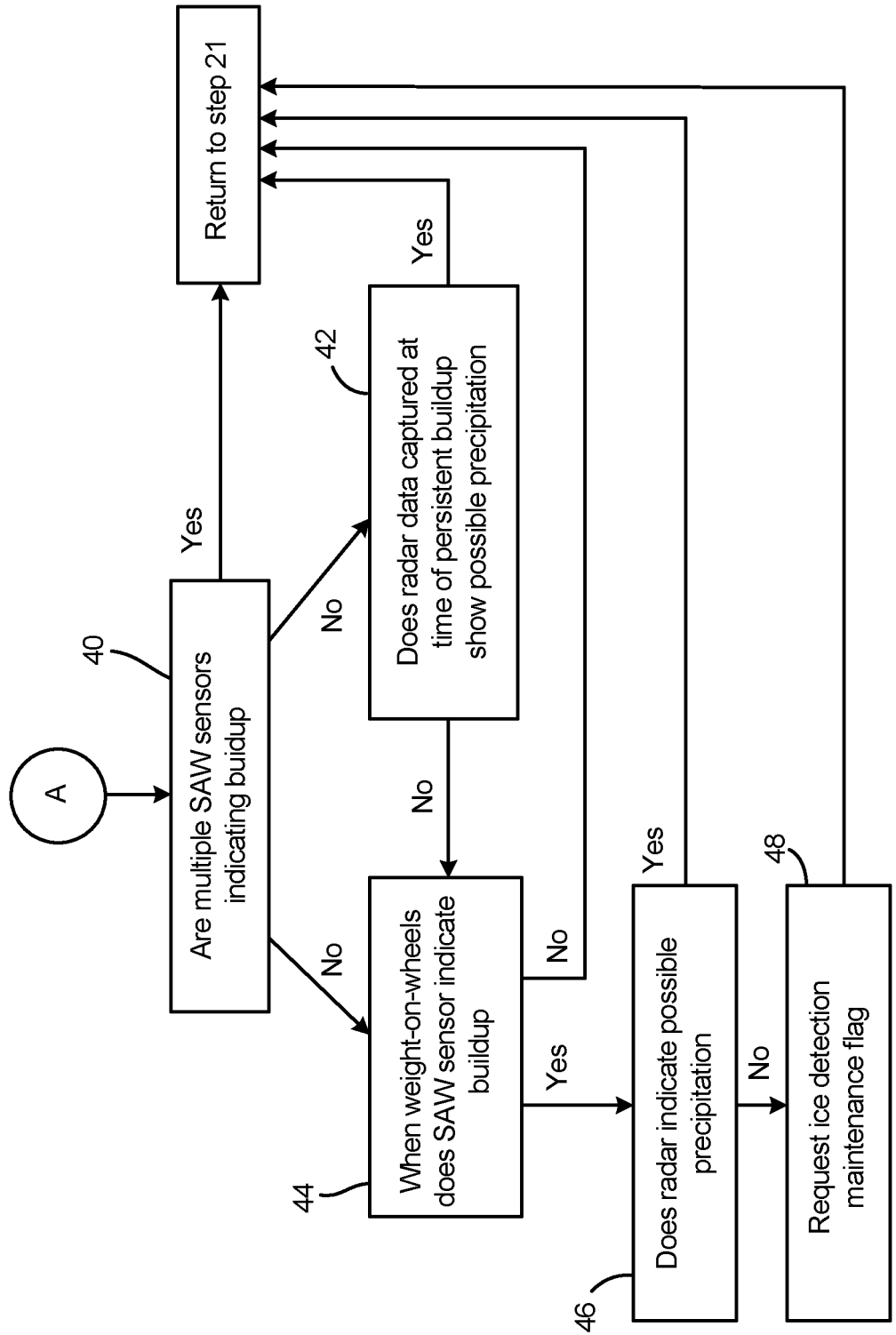

FIGS. 1 and 2A-2B will be described together. FIG. 1 is a schematic illustration of air data system 10 for detecting and responding to icing conditions. FIGS. 2A-B form a flow chart illustrating ice detection health management process 20 of air data system 10. Air data system 10 includes air data probe 12 (including heater 14 and SAW sensor 16), circuitry 18, electronic engine control (EEC/FADEC) 19A, and aircraft on-board computer 19B.

Figure 3:
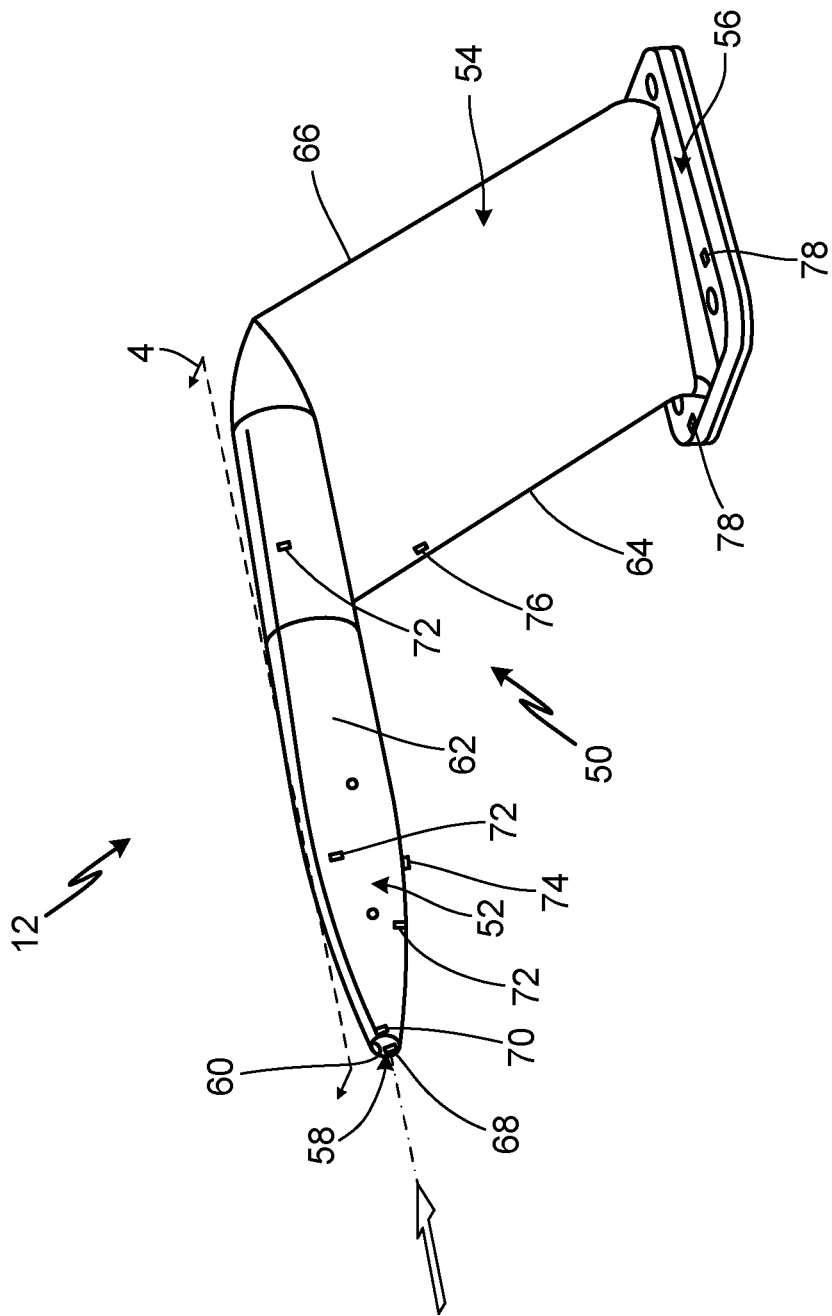
FIG. 3 is a schematic perspective view of an air data probe with surface acoustic wave (SAW) sensors.

Air data system 10 can be an aircraft air data system (e.g., including an aircraft ice detection system) including air data probe 12 connected via circuitry 18 to electronic engine control 19A and/or aircraft on-board computer 19B. Though illustrated in FIG. 1 as a single air data probe 12, air data system 10 can include any number of air data probes 12. Air data probe 12 is generally a thin, "L"-shaped, hollow cylinder. Some exemplary but non-limiting embodiments of air data probe 12 include a pitot probe, a pitot-static probe (as shown in FIG. 3), and a total air temperature probe. Air data probe 12 can be metallic (e.g., aluminum, steel, etc.) or any other suitable material. Air data probe 12 is configured to be installed on an aircraft such that air data probe 12 protrudes from the aircraft fuselage (not shown) into the external airflow.

Air data probe 12 has heater 14 to heat air data probe 12 and any associated components of air data probe 12. Heater 14 is thermally coupled to air data probe 12. Heater 14 may be connected to or contained within any components of air data probe 12. In some examples, heater 14 can include multiple heating elements thermally coupled to air data probe 12 or components of air data probe 12.

Air data probe 12 also includes SAW sensor 16. As will be described in greater detail below with respect to FIGS. 3-5B, SAW sensor 16 can be attached to air data probe 12 such that SAW sensor 16 is exposed to the external airflow and air conditions. SAW sensor 16 can include any number of individual SAW sensors attached to air data probe 12 or an array (i.e., a plurality) of SAW sensors attached to air data probe 12.

Air data probe 12, heater 14, and SAW sensor 16 are connected to circuitry 18 as part of air data system 10. Circuitry 18 can be configured to communicate with any one or more of the components of air data system 10, including: air data probe 12, heater 14, and/or SAW sensor 16. Circuitry 18 can include a wired or wireless connection to components of air data system 10. For example, circuitry 18 can communicate wirelessly with SAW sensor 16 using RF antennas and SAW sensor 16 can receive the RF input.

Air data probe 12 and components of air data probe 12, such as heater 14 are connected to receive control and power from circuitry 18. More specifically, circuitry 18 can be configured to implement process instructions for operational control of air data probe 12 and components of air data probe 12, such as heater 14. Circuitry 18 can also be configured to receive and communicate sensed data from air data probe 12 and/or SAW sensor 16 to electronic engine control 19A and/or aircraft on-board computer 19B. Electronic engine control 19A can include a first electronic engine control for a left engine of the aircraft and a second electronic engine control for a right engine of the aircraft.

Though the example of FIG. 1 illustrates circuitry 18 as operatively coupled (e.g., remote) to air data probe 12, it should be understood that in other examples, circuitry 18 or part of circuitry 18 can be integrated or integrated locally with air data probe 12 to communicate with the components of air data system 10. For example, part of circuitry 18 can be local to air data probe 12 to reduce the need to transmit small signals over a long distance. In yet other examples, circuitry 18 can include more than one circuitry or controller device that can be coupled to or integrated with air data probe 12 to communicate with the components of air data system 10. For example, circuitry 18 can include a first circuitry for receiving and communicating sensed data from SAW sensor 16 and a second circuitry for operational control of heater 14. Circuitry 18 may include, for example, a microcontroller, programmable logic device, application-specific integrated circuit (ASIC), or any other digital and/or analog circuitry.

In operation, air data probe 12 is installed on an aircraft to take in air from surrounding external airflow and communicate air pressures through internal components of air data probe 12. Air pressure measurements are received at circuitry 18. SAW sensor 16 senses accumulation of airborne particulates (e.g., soot, dust, sand, ice, slush, etc.) on air data probe 12. SAW sensor 16 can communicate particulate accumulation measurements to electronic engine control 19A and/or aircraft on-board computer 19B via circuitry 18.

In one embodiment, circuitry 18 can include health management for air data probe 12 and SAW sensor 16. For example, to avoid frequent "nuisance faults," SAW sensor 16 may be configured to signal (via circuitry 18) to electronic engine control 19A and/or aircraft on-board computer 19B only after a predetermined threshold of particulates has accumulated on SAW sensor 16. Inputs from this signal can be synchronized with on-board prognostics and health management (PHM) to provide predictive diagnostics for preventive on-board avionics maintenance. When the predetermined threshold of particulate accumulation is reached during flight, circuitry 18 can signal to heater 14 to start de-icing the contaminated air probe (e.g., air data probe 12). In addition, temperature limits can be set such that circuitry 18 will not activate heater 14 during ambient air conditions where ice is not present (e.g., tropical rainstorms, fog, condensation, etc.). In some examples, heater 14 can remain inactive at temperatures at or above about 40° F. (approx. 4.4° C.).

In another embodiment, for example, in the case of excessive debris accumulation (e.g., due to significant ice buildup, inability of heater 14 to effectively de-ice, etc.), a weight-on-wheels (WOW) sensor of the contaminated air data probe, such as air data probe 12, can send a signal via circuitry 18 to remaining functional air data probes within air data system 10 to continue providing air data to electronic engine control 19A and/or aircraft on-board computer 19B, while the contaminated air data probe is isolated from air data system 10. This prevents confusing or erroneous data input to the captain's and the first officer's instruments. In addition, the WOW sensor of the contaminated air data probe can send a signal via circuitry 18 to latch the contaminated air data probe upon aircraft landing and to remain latched until a ground maintenance crew cleans and/or replaces the clogged air data probe (and/or the affected SAW sensor) and inspects operation of air data system 10.

Referring now to FIGS. 2A-2B, air data system 10 can execute ice detection health management process 20 via circuitry 18 and communication with electronic engine control 19A and/or aircraft on-board computer 19B. Process 20 analyzes data from, e.g., SAW sensor 16 and other data to enable rational decisions on aircraft flight operations and maintenance.

At step 21 of process 20, it is determined whether a SAW sensor maintenance flag has been set. If a maintenance flag has been set, indicating a fault, etc. from one or more SAW sensors, process 20 proceeds to step 22 and maintenance is performed (e.g., by a ground crew when the aircraft has landed). Maintenance can include replacing a clogged air data probe or an affected SAW sensor and inspecting operation of air data system 10. At this point, process 20 also proceeds to a check (described below at step 28) if the ambient temperature is below a threshold of about 40° F. (approx. 4.4° C.). If so, the air data probe heater (e.g., heater 14) is turned "ON" for safety.

If a maintenance flag is not set in step 21, process 20 proceeds to step 24 for monitoring SAW sensor responses. SAW sensor responses include sensed particulate accumulation measurements from SAW sensor 16 (FIG. 1). At step 26, it is determined if the SAW sensor response indicates a buildup of particulates over a persistent duration (i.e., a valid signal from the SAW sensor has been received over some predetermined period). If a persistent buildup of particulates is not sensed in step 26, process 20 returns to step 21. This loop can represent a normal operation loop for the aircraft.

At step 28, it is determined if the ambient temperature is below a threshold of about 40° F. (approx. 4.4° C.). The air data probe heater (e.g., heater 14) is turned "ON" at temperatures below about 40° F. (step 30) but remains inactive (i.e., "OFF") at temperatures at or above about 40° F. (step 32). At step 34, it is determined if the measured ambient temperature and pressure are within a cross range check for matched conditions. For example, conditions can be matched for comparison between a left and a right engine of the same aircraft. At step 36, it is determined if the air data probe heaters are functioning. A negative result at step 34 and/or step 36 will trigger a system fault indication at step 38.

If the heater is "OFF," as determined at step 32, process 20 proceeds to step 40 along process branch A. At step 40, it is determined if multiple SAW sensors are indicating particulate buildup. If multiple SAW sensors are indicating particulate buildup, then process 20 returns to step 21.

If multiple SAW sensors are not indicating particulate buildup, then process 20 proceeds to steps 42 and 44 (as shown in FIG. 2B). At step 42, it is determined if aircraft radar data captured during the time when the SAW sensor indicated persistent buildup shows possible precipitation. Radar data, including weather and precipitation information, and GPS data can be received by an aircraft on-board computer (e.g., aircraft on-board computer 19B of FIG. 1). At step 44, process 20 verifies if the SAW sensor indicates persistent buildup when the aircraft has weight-on-wheels (e.g., as indicated by a WOW sensor). An affirmative result at step 44 will cause process 20 to proceed to another check if radar data indicates possible precipitation (step 46). If radar data indicates possible precipitation, e.g., at either step 42 or step 46, then process 20 returns to step 21 (FIG. 2A). If radar data does not indicate possible precipitation at step 46, a request is made to the system for an ice detection maintenance flag to be set, and process 20 returns to step 21 (FIG. 2A).

Ice formation and ice blockage of an air data probe inlet can disturb the pressure measurements and/or completely block the openings of the air data probe. This, in turn, can lead to erroneous data being detected and fed to electronic engine control 19A and/or aircraft on-board computer 19B, potentially resulting in flight safety challenges. Effective and timely detection of ice formation on or within an air data probe is important, as it relates to the continued safe operation of the aircraft.

Air data system 10 including SAW sensor 16 attached to air data probe 12, as described herein, enables early detection and warning about the start of icing on or inside air data probe 12, which improves reliability and safety of aircraft flight operations. Because signaling based on measurements from SAW sensor 16 can be used to inform pilots of icing conditions, particularly when an air data probe heater has failed, pilots are able to change course to avoid the icing flight path. Early detection and warning of icing further enables proactive preventative maintenance of contaminated air data probes when the aircraft is on the ground. Moreover, air data system 10 can have improved efficiency because signaling (i.e., sensed particulate accumulation measurements) from SAW sensor 16 allows heater 14 to remain inactive during ambient weather conditions when ice is unlikely to be present.

Figure 4:
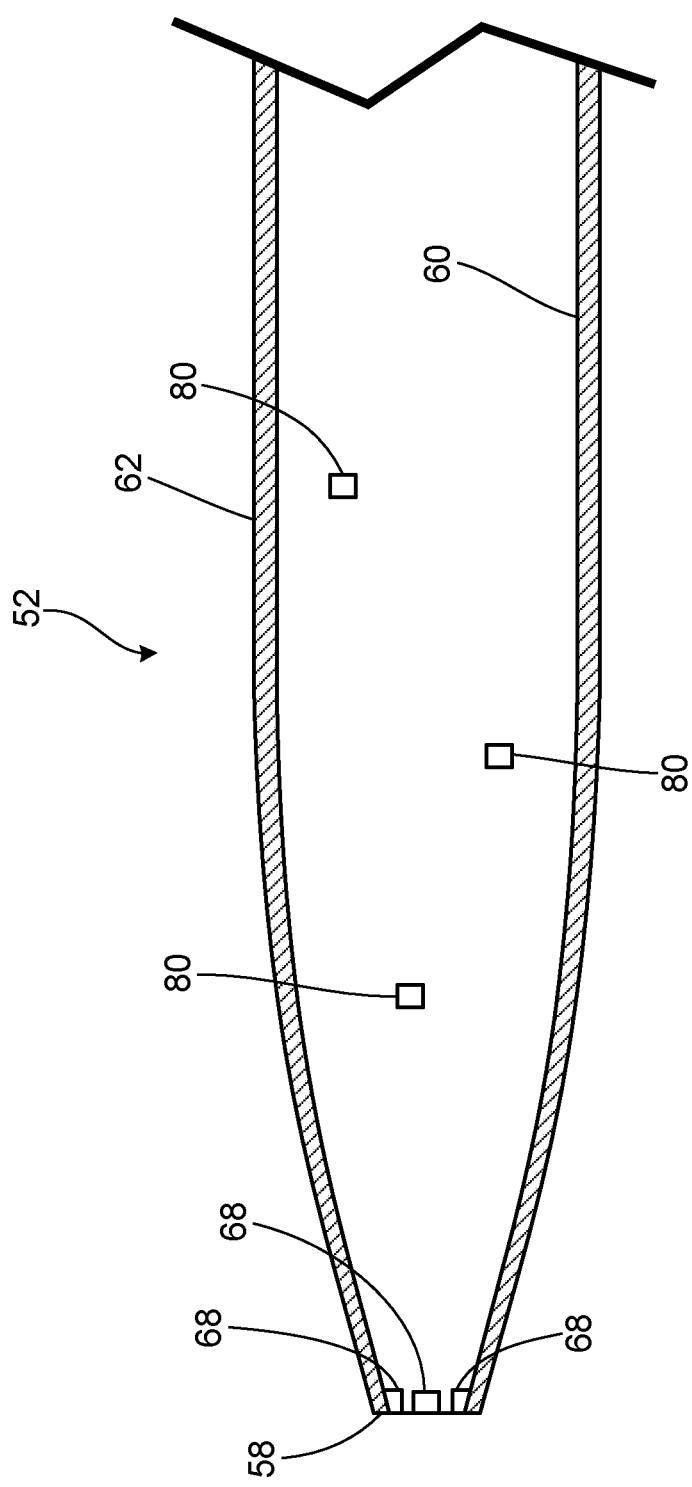
FIG. 4 is an enlarged schematic cross-sectional view of the air data probe of FIG. 3 showing circumferentially arranged SAW sensors.

FIGS. 3 and 4 will be described together. FIG. 3 is a schematic perspective view of air data probe 12 with surface acoustic wave (SAW) sensors. FIG. 4 is an enlarged schematic cross-sectional view of air data probe 12 showing circumferentially arranged SAW sensors.

Air data probe 12 includes body 50, formed by probe head 52 and strut 54, and mounting plate 56. Probe head 52 includes inlet 58, interior surface 60, and exterior surface 62. Strut 54 includes leading edge 64 and trailing edge 66. SAW sensors 68, 70, 72, 74, 76, 78, and 80 are attached to air data probe 12.

Body 50 of air data probe 12 is formed by probe head 52 and strut 54. Probe head 52 is the sensing head of air data probe 12. Probe head 52 is a forward portion of air data probe 12. Probe head 52 has one or more ports positioned in probe head 52. Internal components of air data probe 12 are located within probe head 52. Probe head 52 is connected to a first end of strut 54. Probe head 52 and strut 54 make up body 50 of air data probe 12. Strut 54 is blade shaped. Internal components of air data probe 12 are located within strut 54. Strut 54 is adjacent mounting plate 56. A second end of strut 54 is connected to mounting plate 56. Mounting plate 56 makes up a mount of air data probe 12. Mounting plate 56 is connectable to an aircraft.

Probe head 52 has inlet 58 at a forward, or upstream, portion of probe head 52. Inlet 58 is at the end of probe head 52 opposite the end of probe head 52 that is connected to strut 54. Interior surface 60 extends from inlet 58 and is at an interior of probe head 52. Interior surface 60 defines an interior passageway or tube within probe head 52. Exterior surface 62 extends from inlet 58 and is at an exterior of probe head 52. Interior surface 60 and exterior surface 62 meet at inlet 58.

Strut 54 has leading edge 64 at a forward, or upstream, side of strut 54 and trailing edge 66 at an aft, or downstream, side of strut 54. Leading edge 64 is opposite trailing edge 66.

SAW sensors 68, 70, 72, 74, 76, 78, and 80 are examples of SAW sensor 16 described above with respect to FIG. 1. Each of SAW sensors 68, 70, 72, 74, 76, 78, and 80 is attached to air data probe 12. SAW sensors 68, 70, 72, 74, 76, 78, and 80 can be attached to air data probe 12 by any suitable attachment means, including but not limited to adhesives and/or fasteners. SAW sensors 68, 70, 72, 74, 76, 78, and 80 are thin, conformable layers. Any wiring (e.g., a power connector and/or leads) associated with SAW sensors 68, 70, 72, 74, 76, 78, and 80 can extend internally within air data probe 12 (e.g., as part of or connectable to circuitry 18 shown in FIG. 1). Further, the surface of air data probe 12 can be sculpted to include recesses sized such that SAW sensors 68, 70, 72, 74, 76, 78, and 80 can be flush with (i.e., embedded in) the surface of air data probe 12.

SAW sensors can be connected at various locations on air data probe 12. In some examples, air data probe 12 includes a single SAW sensor (e.g., one of SAW sensors 68, 70, 72, 74, 76, 78, and 80). In other examples, air data probe 12 includes one or more of each of SAW sensors 68, 70, 72, 74, 76, 78, and 80. Air data probe 12 can include any suitable number and combination of SAW sensors 68, 70, 72, 74, 76, 78, and 80. The number, location, and orientation of the SAW sensors can be selected to optimize the overall performance of the ice detection system of air data system 10 (FIG. 1).

More specifically, SAW sensors 68 are attached to interior surface 60 of probe head 52 near inlet 58. As shown in FIG. 4, SAW sensors 68 can be arranged circumferentially around interior surface 60. SAW sensors 68 can be a single SAW sensor as shown in FIG. 3 or multiple (i.e., an array) of SAW sensors as shown in FIG. 4. SAW sensors 80 are attached to interior surface 60 of probe head 52 away from inlet 58. As shown in FIG. 4, SAW sensors 80 can be arranged circumferentially around interior surface 60. SAW sensors 80 can be attached at any location along interior surface 60. SAW sensors 80 can be a single SAW sensor or multiple SAW sensors as shown in FIG. 4. For example, FIG. 4 depicts three SAW sensors 68 and three SAW sensors 80. However, it should be understood that other examples can include any suitable number of SAW sensors 68 and 80 (e.g., FIG. 3 depicts a single SAW sensor 68).

SAW sensor 70 is attached to exterior surface 62 of probe head 52 near inlet 58. SAW sensor 70 can be a single SAW sensor as shown in FIG. 3 or multiple SAW sensors. SAW sensors 72 and 74 are attached to exterior surface 62 of probe head 52 away from inlet 58. SAW sensors 72 and 74 can be attached at any location along exterior surface 62. SAW sensors 72 and 74 can be single SAW sensors (e.g., SAW sensor 74 of FIG. 3) or multiple SAW sensors (e.g., SAW sensors 72 of FIG. 3). For example, FIG. 3 depicts a single SAW sensor 70, three SAW sensors 72, and a single SAW sensor 74. However, it should be understood that other examples can include any suitable number of SAW sensors 70, 72, and 74.

SAW sensor 76 is attached to strut 54 adjacent leading edge 64 such that SAW sensor 76 is at a forward portion of strut 54. SAW sensor 76 can be a single SAW sensor as shown in FIG. 3 or multiple SAW sensors. SAW sensors 78 are attached to mounting plate 56. SAW sensors 78 can be attached to a forward portion of mounting plate 56. SAW sensors 78 can be a single SAW sensor or multiple SAW sensors as shown in FIG. 3. For example, FIG. 3 depicts a single SAW sensor 76 and two SAW sensors 78. However, it should be understood that other examples can include any suitable number of SAW sensors 76 and 78.

Any of the SAW sensors attached to air data probe 12 can be oriented substantially parallel to oncoming airflow (e.g., as illustrated by SAW sensors 68, 70, 72, 76, 78, and 80 in FIGS. 3-4). SAW sensors oriented substantially parallel to oncoming airflow can be positioned such that the SAW sensors are flush with the surface of air data probe 12. Any of the SAW sensors attached to air data probe 12 can also be oriented substantially orthogonal to oncoming airflow (e.g., as illustrated by SAW sensor 74 in FIG. 3). SAW sensors oriented substantially orthogonal to oncoming airflow can extend outwardly from the surface of air data probe 12.

Air data probe 12 or any components of air data probe 12, such as probe head 52, can be formed partially or entirely by additive manufacturing. For metal components (e.g., nickel-based superalloys, aluminum, titanium, etc.) exemplary additive manufacturing processes include powder bed fusion techniques such as direct metal laser sintering (DMLS), laser net shape manufacturing (LNSM), electron beam manufacturing (EBM), to name a few, non-limiting examples. For polymer or plastic components, stereolithography (SLA) can be used. Additive manufacturing is particularly useful in obtaining complex geometries and for reducing the need for welds or other attachments. However, any other suitable manufacturing processes can also be used.

During an additive manufacturing process, air data probe 12 or any components of air data probe 12 can be formed layer by layer to achieve complex internal passages and sculpted surfaces for flush attachment of sensors (e.g., SAW sensors 68, 70, 72, 76, 78, and 80). Each additively manufactured layer creates a new horizontal build plane to which a subsequent layer is fused. That is, the build plane for the additive manufacturing process remains horizontal but shifts vertically by defined increments (e.g., one micrometer, one hundredth of a millimeter, one tenth of a millimeter, a millimeter, or other distances) as manufacturing proceeds. Therefore, air data probe 12 or any components of air data probe 12 can be additively manufactured as a single, monolithic unit.

Air data probe 12 is configured to be installed on an aircraft. Air data probe 12 may be mounted to a fuselage of the aircraft via mounting plate 56 and fasteners, such as screws or bolts. Strut 54 holds probe head 52 away from the fuselage of the aircraft to expose probe head 52 to external airflow. Probe head 52 takes in air from surrounding external airflow and communicates air pressures pneumatically through internal components and passages of probe head 52 and strut 54. Pressure measurements are communicated to a flight computer (e.g., via circuitry 18 as shown in FIG. 1) and can be used to generate air data parameters related to the aircraft flight condition.

The external airflow may contain water or ice particles that can collect or freeze on air data probe 12 upon impact. Water impacting air data probe 12 may cause ice accumulation on air data probe 12. Ice may accumulate in greater amounts on a primary accumulation region of air data probe 12 that is defined by a portion of probe head 52 adjacent inlet 58, leading edge 64 of strut 54, and a forward portion of mounting plate 56.

In operation, SAW sensors 68, 70, 72, 74, 76, 78, and 80 sense accumulation of air-borne particulates (e.g., soot, dust, sand, ice, slush, etc.) on air data probe 12 as these particulates accumulate on the SAW sensors. SAW sensors 68, 70, 72, 74, 76, 78, and 80 detect small changes in mass loads due to particulate (e.g., icing) deposits on the surfaces of air data probe 12. Further, any of SAW sensors 68, 70, 72, 74, 76, 78, and 80 can be oriented substantially orthogonal to the oncoming airflow (as illustrated in FIG. 3 by SAW sensor 74) to be more directly impacted by air-borne particulate matter, depending on the external conditions. The SAW sensors that are oriented substantially parallel to oncoming airflow are exposed to static temperature and pressure. The SAW sensors that are oriented substantially orthogonal to oncoming airflow are exposed to total (i.e., dynamic) temperature and pressure. Thus, measurements from any of SAW sensors 68, 70, 72, 74, 76, 78, and 80 can be interpreted to account for the sensor's response to temperature and pressure conditions. More generally, the SAW sensor response can be sensitive to ambient temperature, so it is possible to account for that sensitivity if the temperature is known. In addition, a baseline SAW sensor response to total pressure ram effects can be correlated and accounted for with air data such as navigation GPS position and velocity, outside air temperature, outside air pressure, and air data probe total pressure.

In some embodiments, ice that has melted and re-frozen inside probe head 52 (i.e., within the probe tube along interior surface 60) is sensed when it accumulates on SAW sensors 68 or on SAW sensors 80, if the ice has re-frozen further within probe head 52.

In other embodiments, ice is also detected when it accumulates on the outer or exterior surfaces of air data probe 12, such as on exterior surface 62 of probe head 52, strut 54, or mounting plate 56. Ice that accumulates on exterior surface 62 can be sensed by SAW sensors 72 and 74; ice that accumulates on strut 54 can be sensed by SAW sensor 76; and ice that accumulates on mounting plates 26 can be sensed by SAW sensors 78.

Air data probes, such as air data probe 12, are required to maintain performance in severe and extensive icing environments. Air data probes, such as air data probe 12, are exposed to increased levels of icing. Large ice growths on air data probes, such as air data probe 12, can interfere with the accuracy of the air data probe output. For example, ice can block an air data probe inlet, such as inlet 58, and interfere with total pressure measurements, or ice can cover an entirety of the air data probe and interfere with total temperature measurements. Further, shedding of large ice sheets can cause damage to an aircraft engine. As such, the benefits of SAW sensors for ice detection can also apply to any surface where ice accumulation is undesirable (e.g., aircraft wings). In general, it is desirable to have early detection and warning of ice accumulation on air data probes.

SAW sensors 68, 70, 72, 74, 76, 78, and 80 permit early detection and warning of ice accumulation on air data probe 12. Because SAW sensors are small, conformable devices, using SAW sensors 68, 70, 72, 74, 76, 78, and 80 on air data probe 12 can also reduce the complexity of ice detection systems. In other words, the ice detection system (e.g., of air data system 10 of FIG. 1) including SAW sensors 68, 70, 72, 74, 76, 78, and 80 on air data probe 12 can be simpler than other aircraft ice detection systems. Moreover, SAW sensors 68, 70, 72, 74, 76, 78, and 80 are positioned in various locations and orientations along the interior and exterior of air data probe 12 to reliably detect ice accumulation in any of these regions. The number, location, and orientation of SAW sensors 68, 70, 72, 74, 76, 78, and 80 can be selected to optimize overall ice detection based on the air conditions. Thus, SAW sensors 68, 70, 72, 74, 76, 78, and 80 attached to air data probe 12 enable early detection and warning about the start of icing on or inside air data probe 12, which improves reliability and safety of aircraft flight operations.

Figure 5A:
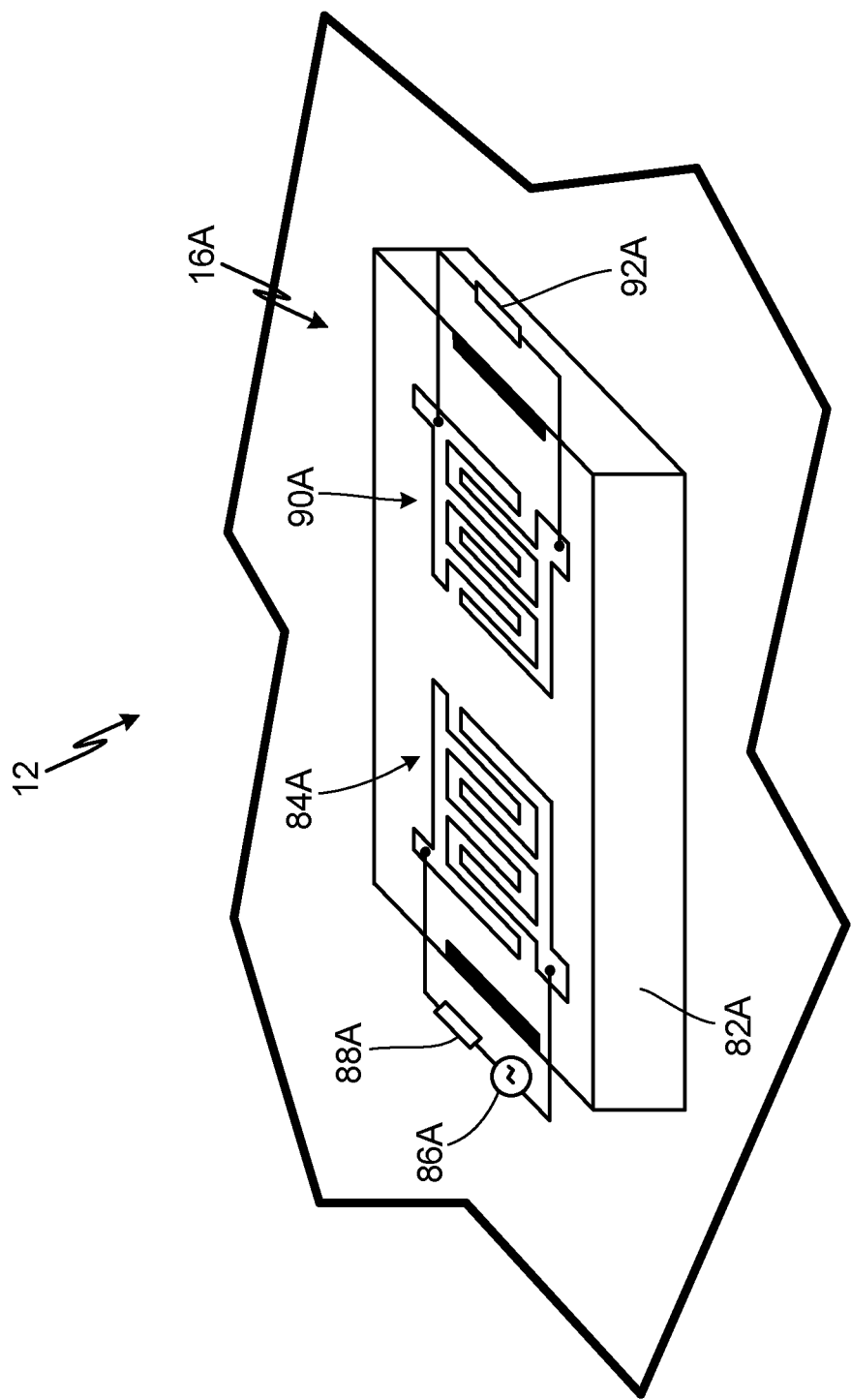
FIG. 5A is an enlarged partial perspective schematic view of an air data probe showing a SAW sensor configured as a film thickness sensor.

FIG. 5A is an enlarged partial perspective schematic view of air data probe 12 showing SAW sensor 16A configured as a film thickness sensor. SAW sensor 16A is attached to air data probe 12 and includes substrate 82A, input transducer 84A (including signal source 86A and resistor 88A), and output transducer 90A (including resistor 92A). SAW sensor 16A is an embodiment of SAW sensor 16 described above with respect to FIG. 1.

SAW sensor 16A is a thin, conformable layer attached to air data probe 12. Substrate 82A forms a base of SAW sensor 16A. Substrate 82A is a piezoelectric substrate. Various piezoelectric substrates can be used for substrate 82A of SAW sensor 16A, including but not limited to quartz ($SiO_2$), silicon carbide (SiC), lithium tantalite ($LiTaO_3$), lithium nobiate ($LiNbO_3$), gallium arsenide (GaAs), langasite (LGS), zinc oxide (ZnO), aluminum nitride (AlN), lead zirconium titanite (PZT), etc.

Input transducer 84A is positioned on substrate 82A. Input transducer 84A is positioned on a side of SAW sensor 16A opposite the side that is attached to air data probe 12, such that input transducer 84A is exposed to external airflow. Input transducer 84A is an interdigital transducer (IDT). Input transducer 84A forms a circuit with signal source 86A and resistor 88A. Signal source 58A provides power to the circuit. The piezoelectric effect allows input transducer 84A to convert electrical energy from the circuit to mechanical energy and produce a surface acoustic wave when power is provided to the circuit. The surface acoustic wave propagates across a distance to reach output transducer 90A.

Output transducer 90A is positioned on substrate 82A and separated by a distance from input transducer 84A. Output transducer 90A is positioned on the side of SAW sensor 16A opposite the side that is attached to air data probe 12, such that output transducer 90A is exposed to external airflow. Output transducer 90A is an IDT. Output transducer 90A forms a circuit with resistor 92A. Output transducer 90A receives the surface acoustic wave that originated from input transducer 84A and converts mechanical energy back to electrical energy. SAW sensor 16A measures any change in the surface acoustic wave from input transducer 84A to output transducer 90A.

In operation, ice or other air-borne particulate matter can collect (i.e., deposit) on SAW sensor 16A and form a film. The deposited film can form directly on SAW sensor 16A. Presence of the film on SAW sensor 16A can affect the propagation time, wavelength, and amplitude of the surface acoustic wave. The measured surface acoustic wave frequency shift at output transducer 90A is proportional to the mass of the deposited film on SAW sensor 16A. Therefore, SAW sensor 16A measures film density and acoustic impedance to provide film thickness data. If lower accuracy is required, SAW sensor 16A may be operated as a thickness shear mode (TSM) resonator. Film thickness data is communicated to air data system circuitry (e.g., circuitry 18 in FIG. 1).

Ice formation and ice blockage of an air data probe inlet can disturb the pressure measurements and/or completely block the openings of the air data probe. This, in turn, can lead to erroneous data being detected and fed to electronic engine control 19A and/or aircraft on-board computer 19B (FIG. 1), potentially resulting in flight safety challenges. Effective and timely detection of ice formation on or within an air data probe is important, as it relates to the continued safe operation of the aircraft.

Conventional methods for detecting icing conditions on or around air data probes (e.g., optical, passive (inferred), etc.) may be suitable for certain flight conditions, usually during available daylight. However, due to ice transparency, adequate detection of icing conditions on or around air data probes during low visibility conditions is a challenge.

SAW sensor 16A functioning as a film thickness sensor is insensitive to ambient lighting conditions. That is, SAW sensor 16A can reliably detect ice accumulation on air data probe 12 in a variety of lighting and weather conditions, including at high altitudes during night-time when visibility is low. Thus, SAW sensor 16A attached to air data probe 12 enables early detection and warning about the start of icing on or inside air data probe 12, which improves reliability and safety of aircraft flight operations.

Figure 5B:
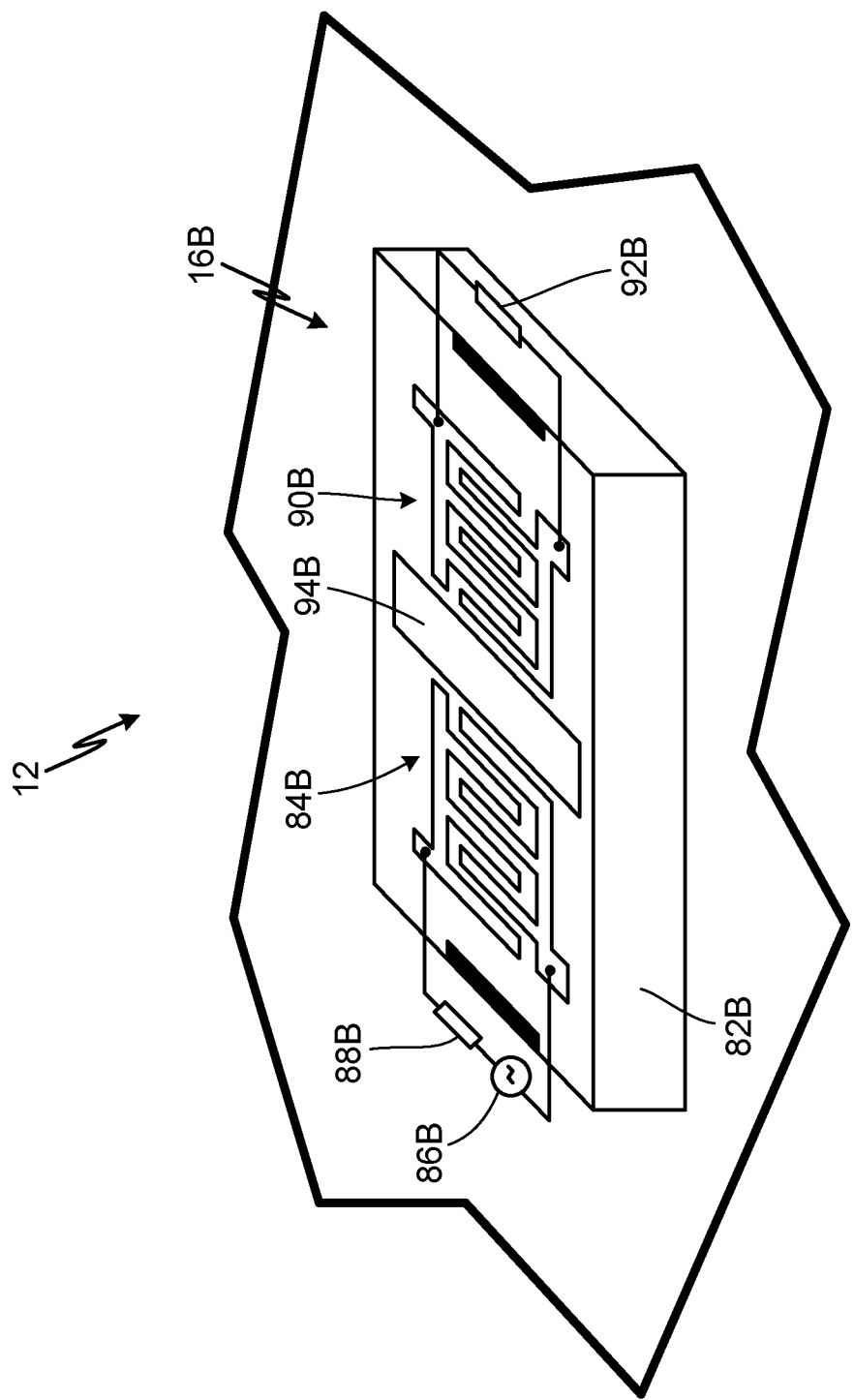
FIG. 5B is an enlarged partial perspective schematic view of an air data probe showing a SAW sensor configured as a particulate sensor.

FIG. 5B is an enlarged partial perspective schematic view of air data probe 12 showing SAW sensor 16B configured as a particulate sensor. SAW sensor 16B is attached to air data probe 12 and includes substrate 82B, input transducer 84B (including signal source 86B and resistor 88B), output transducer 90B (including resistor 92B), and adhesive layer 94B. SAW sensor 16B is an embodiment of SAW sensor 16 described above with respect to FIG. 1. SAW sensor 16B has generally the same structure as described above with reference to SAW sensor 16A of FIG. 5A, except SAW sensor 16B additionally includes adhesive layer 94B. (Shared components of SAW sensors 16A and 16B are labeled with a shared reference number and "A" or "B," respectively.)

SAW sensor 16B is coated with an adhesive substance that forms adhesive layer 94B. Adhesive layer 94B is positioned on substrate 82B. Adhesive layer is positioned on the side of SAW sensor 16B opposite the side that is attached to air data probe 12, such that adhesive layer 94B is exposed to external airflow. Adhesive layer 94B is positioned between input transducer 84B and output transducer 90B. Thus, the surface acoustic wave produced by input transducer 84B can propagate over adhesive layer 94B.

In operation, ice or other air-borne particulate matter can collect (i.e., deposit) on SAW sensor 16B. Specifically, particulates can collect on adhesive layer 94B. Any non-liquid particulate landing on adhesive layer 94B of SAW sensor 16B will perturb the propagation of the surface acoustic wave (i.e., presence of particulates on adhesive layer 94B can affect the propagation time, wavelength, and amplitude of the surface acoustic wave). SAW sensor 16B measures the perturbations in the wave propagation to sense the mass of the deposited particulates. For example, SAW sensor 16B can have a mass resolution of 3 picograms. Particulate mass data is communicated to air data system circuitry (e.g., circuitry 18 in FIG. 1).

Ice formation and ice blockage of an air data probe inlet can disturb the pressure measurements and/or completely block the openings of the air data probe. This, in turn, can lead to erroneous data being detected and fed to electronic engine control 19A and/or aircraft on-board computer 19B (FIG. 1), potentially resulting in flight safety challenges. Effective and timely detection of ice formation on or within an air data probe is important, as it relates to the continued safe operation of the aircraft.

Conventional methods for detecting icing conditions on or around air data probes (e.g., optical, passive (inferred), etc.) may be suitable for certain flight conditions, usually during available daylight. However, due to ice transparency, adequate detection of icing conditions on or around air data probes during low visibility conditions is a challenge.

SAW sensor 16B functioning as a particulate sensor is insensitive to ambient lighting conditions. That is, SAW sensor 16B can reliably detect ice accumulation on air data probe 12 in a variety of lighting and weather conditions, including at high altitudes during night-time when visibility is low. Thus, SAW sensor 16B attached to air data probe 12 enables early detection and warning about the start of icing on or inside air data probe 12, which improves reliability and safety of aircraft flight operations.

Discussion of Possible Embodiments

The following are non-exclusive descriptions of possible embodiments of the present invention.

An air data system includes an air data probe and a surface acoustic wave (SAW) sensor attached to the air data probe for detecting particulate accumulation. The air data probe includes a probe head, a strut connected to the head, and a mounting plate connected to the strut. The probe head has an inlet, an interior surface extending from the inlet, and an exterior surface extending from the inlet.

The air data system of the preceding paragraph can optionally include, additionally and/or alternatively, any one or more of the following features, configurations and/or additional components:

The SAW sensor can be a particulate sensor having an adhesive layer.

The SAW sensor can be a film thickness sensor such that a film of ice can accumulate directly on the SAW sensor.

The SAW sensor can be attached to the interior surface of the probe head.

The SAW sensor can be attached adjacent the inlet.

The SAW sensor can be attached to the exterior surface of the probe head.

The SAW sensor can be attached adjacent the inlet.

The SAW sensor can be attached to the strut.

The SAW sensor can be attached adjacent a leading edge of the strut.

The SAW sensor can be attached to the mounting plate.

The SAW sensor can be attached to the air data probe such that the SAW sensor is oriented substantially parallel to an oncoming airflow when the air data probe is installed on an aircraft.

The SAW sensor can be attached to the air data probe such that the SAW sensor is oriented substantially orthogonal to an oncoming airflow when the air data probe is installed on an aircraft.

The SAW sensor can be configured to signal to a heater that is thermally coupled to the air data probe to activate the heater when the SAW sensor detects a predetermined threshold level of particulate accumulation during aircraft flight.

The heater can be configured to remain inactive during ambient air conditions when ice is not present.

The air data probe can be configured to be isolated from the air data system when the SAW sensor detects an excessive amount of particulate accumulation.

The air data probe can be a pitot probe, a pitot-static probe, or a total air temperature (TAT) probe.

The SAW sensor can be a thin, conformable layer.

The air data probe can further include a primary accumulation region defined by a portion of the probe head adjacent the inlet, a leading edge of the strut, and a forward portion of the mounting plate, and the SAW sensor can be attached to the air data probe at the primary accumulation region.

An air data system includes an air data probe and a plurality of surface acoustic wave (SAW) sensors attached to the air data probe for detecting particulate accumulation. The air data probe includes a probe head, a strut connected to the head, and a mounting plate connected to the strut. The probe head has an inlet, an interior surface extending from the inlet, and an exterior surface extending from the inlet. At least one of the plurality of SAW sensors is positioned on each of the interior surface of the probe head, the exterior surface of the probe head, the strut, and the mounting plate.

A method of detecting particulate accumulation on an air data probe, the air data probe having a head, a strut connected to the head, and a mounting plate connected to the strut, includes positioning a surface acoustic wave (SAW) sensor on the air data probe; sensing, by the SAW sensor, an accumulation of particulates; sending a first signal, based on the sensed accumulation of particulates, from the SAW sensor to an air data system circuitry for detecting the accumulation of particulates; sending a second signal from the air data system circuitry to an electronic engine control and/or an aircraft on-board computer when a predetermined threshold level of particulate accumulation is detected; and synchronizing inputs from the first and/or second signal with an on-board prognostics and health management (PHM) system to provide predictive diagnostics for preventative on-board avionics maintenance.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An air data system comprising:
   an air data probe comprising:
      a probe head having an inlet, an interior surface extending from the inlet, and an exterior surface extending from the inlet;
      a strut connected to the head; and
      a mounting plate connected to the strut; and
   a surface acoustic wave (SAW) sensor attached to the air data probe for detecting particulate accumulation.

2. The air data system of claim 1, wherein the SAW sensor is a particulate sensor having an adhesive layer.

3. The air data system of claim 1, wherein the SAW sensor is a film thickness sensor such that a film of ice can accumulate directly on the SAW sensor.

4. The air data system of claim 1, wherein the SAW sensor is attached to the interior surface of the probe head.

5. The air data system of claim 4, wherein the SAW sensor is attached adjacent the inlet.

6. The air data system of claim 1, wherein the SAW sensor is attached to the exterior surface of the probe head.

7. The air data system of claim 6, wherein the SAW sensor is attached adjacent the inlet.

8. The air data system of claim 1, wherein the SAW sensor is attached to the strut.

9. The air data system of claim 8, wherein the SAW sensor is attached adjacent a leading edge of the strut.

10. The air data system of claim 1, wherein the SAW sensor is attached to the mounting plate.

11. The air data system of claim 1, wherein the SAW sensor is attached to the air data probe such that the SAW sensor is oriented substantially parallel to an oncoming airflow when the air data probe is installed on an aircraft.

12. The air data system of claim 1, wherein the SAW sensor is attached to the air data probe such that the SAW sensor is oriented substantially orthogonal to an oncoming airflow when the air data probe is installed on an aircraft.

13. The air data system of claim 1, wherein the SAW sensor is configured to signal to a heater that is thermally coupled to the air data probe to activate the heater when the SAW sensor detects a predetermined threshold level of particulate accumulation during aircraft flight.

14. The air data system of claim 13, wherein the heater is configured to remain inactive during ambient air conditions when ice is not present.

15. The air data system of claim 1, wherein the air data probe is configured to be isolated from the air data system when the SAW sensor detects an excessive amount of particulate accumulation.

16. The air data system of claim 1, wherein the air data probe is a pitot probe, a pitot-static probe, or a total air temperature (TAT) probe.

17. The air data system of claim 1, wherein the SAW sensor is a thin, conformable layer.

18. The air data system of claim 1, wherein the air data probe further comprises:
   a primary accumulation region defined by a portion of the probe head adjacent the inlet, a leading edge of the strut, and a forward portion of the mounting plate;
   wherein the SAW sensor is attached to the air data probe at the primary accumulation region.

19. An air data system comprising:
   an air data probe comprising:
      a probe head having an inlet, an interior surface extending from the inlet, and an exterior surface extending from the inlet;
      a strut connected to the head; and
      a mounting plate connected to the strut; and
      a plurality of surface acoustic wave (SAW) sensors attached to the air data probe for detecting particulate accumulation;
   wherein at least one of the plurality of SAW sensors is positioned on each of the interior surface of the probe head, the exterior surface of the probe head, the strut, and the mounting plate.

20. A method of detecting particulate accumulation on an air data probe, the air data probe having a head, a strut connected to the head, and a mounting plate connected to the strut, the method comprising:
   positioning a surface acoustic wave (SAW) sensor on the air data probe;
   sensing, by the SAW sensor, an accumulation of particulates;
   sending a first signal, based on the sensed accumulation of particulates, from the SAW sensor to an air data system circuitry for detecting the accumulation of particulates;
   sending a second signal from the air data system circuitry to an electronic engine control and/or an aircraft on-board computer when a predetermined threshold level of particulate accumulation is detected; and
   synchronizing inputs from the first and/or second signal with an on-board prognostics and health management (PHM) system to provide predictive diagnostics for preventative on-board avionics maintenance.

\* \* \* \* \*